United States Patent [19]

Clampitt

[11] 4,007,789

[45] Feb. 15, 1977

[54] ACIDIZING WELLS

[75] Inventor: Richard L. Clampitt, Bartlesville, Okla.

[73] Assignee: Phillips Petroleum Company, Bartlesville, Okla.

[22] Filed: Sept. 10, 1975

[21] Appl. No.: 612,080

[52] U.S. Cl. .............................. 166/281; 166/307
[51] Int. Cl.$^2$ ................. E21B 33/138; E21B 43/27
[58] Field of Search .......... 166/307, 281, 294, 306, 166/305 R, 271, 274

[56] References Cited

UNITED STATES PATENTS

| | | | |
|---|---|---|---|
| 2,122,452 | 7/1938 | Clason ................................ | 166/281 |
| 3,160,206 | 12/1964 | Jorda .............................. | 166/305 R |
| 3,353,604 | 11/1967 | Gibson et al. ..................... | 166/281 |
| 3,612,179 | 10/1971 | Anderson et al. ................. | 166/281 |
| 3,707,194 | 12/1972 | Svaldi ............................ | 166/305 R |
| 3,724,549 | 4/1973 | Dill ................................. | 166/281 X |
| 3,727,687 | 4/1973 | Clampitt et al. ................. | 166/294 X |
| 3,727,688 | 4/1973 | Clampitt ........................ | 166/307 X |
| 3,845,822 | 11/1974 | Clampitt et al. .................... | 166/281 |

*Primary Examiner*—Stephen J. Novosad
*Assistant Examiner*—George A. Suchfield

[57] ABSTRACT

Method for the acid treatment of a subterranean formation surrounding a wellbore comprising introducing alternate slugs of acid and an aqueous gel prepared from water-soluble cellulose ethers into a borehole penetrating a formation to be acidized. The slugs of gel serve as spacer slugs to direct the acid slugs into the portions of the formation or zones of a multi-zone formation it is desired to acidize.

7 Claims, No Drawings

ACIDIZING WELLS

This invention relates to the acid treatment of formations and sections of subterranean formations surrounding oil wells, gas wells, water wells, and similar boreholes. In accordance with another aspect, this invention relates to the use of aqueous gel compositions as temporary diversion agents or spacer slugs in matrix acidizing treatments where multiple zones need to be treated. In accordance with a further aspect, this invention relates to the matrix acidizing of subterranean formations comprising introducing alternate slugs of an aqueous gel and an acid into a borehole penetrating a formation to be acidized. In accordance with a further aspect, this invention relates to the matrix acidizing of subterranean formations using gelled solutions of water-soluble cellulose ethers containing a finely divided solid capable of increasing the gel strength of the gel spacer slugs.

The susceptibility of fluid-bearing geological formations to treatment by chemical reagents has resulted in the development of a number of processes which employ acidic reagents to remedy geological formations having low production rates due to their low permeability, discontinuous porosity, or to the presence of formation plugging contaminating materials which can form and accumulate on or in the formation. An acidizing composition contains a substance reactive with the formation for the purpose of enlarging passages therethrough, and thereby increasing the rate and amount of production of formation fluids therefrom. Acids useful with this invention include any acid which will cause an increase in the flow of fluids in the hydrocarbon-bearing formation. For example, the acid can chemically attack wellbore deposits of scale, such as iron sulfide, can solubilize carbonate deposits, solubilize wax and other deposits of objectional hydrocarbons, etc.

There are two major fundamental techniques in acidizing treatments of wells. One technique involves the injection of acid into a subsurface formation at pressures above hydraulic fracturing pressures and is called acid fracturing. The flow patterns in this technique are essentially through the fracture(s) and much of the fluid leaks off into the matrix along the fracture faces. In the other technique, acid is injected into the matrix or pore structure of the rock formation below the hydraulic fracturing pressure and is called matrix acidizing. The flow pattern of the fluid is essentially through the natural permeability structure. The success of any acid stimulation treatment depends on the correct analysis of the well problem so that proper materials and techniques can be selected. Well problems can be classified into two categories, namely, damaged permeability and low natural permeability. Wells with damaged permeability are candidates for matrix acid treatments. Matrix acidizing is selected as the proper technique for the removal of formation damage, either natural or induced, to achieve low pressure breakdown of formations prior to fracturing and to achieve uniform breakdown of all perforations. The damage can be removed and natural permeability restored in two ways: first, by dissolving the damaging material itself, or by dissolving part of the rock in which the damage exists.

The present invention provides a solution for the problems discussed in the preceding paragraph and other problems related thereto. The present invention provides a method of acidizing an underground formation by injecting slugs of aqueous gels between acid slugs, said gels being prepared with solutions of cellulose ethers to provide temporary plugs or spacer plugs in an oil-bearing formation as described further hereinafter.

Accordingly, an object of this invention is to provide an improved method for acidizing multiple zone formations.

Another object of this invention is to provide an improved method wherein wells can be acid treated more efficiently and more effectively.

Another object of this invention is to provide a temporary spacer plug when acidizing multi-zone formations.

Other objects and aspects, as well as the several advantages of the invention, will be apparent to those skilled in the art upon reading the specification and the appended claims.

Thus, according to the invention, there is provided a method for acidizing subterranean formations using (a) gelled aqueous solutions of cellulose ethers and (b) gelled aqueous solutions of cellulose ethers containing a finely divided solid capable of increasing the gel strength of the gel as spacer materials between slugs of acid introduced into a formation.

More specifically, according to the invention, there is provided a method of matrix acidizing comprising introducing alternate slugs of (1) an acid and (2) an aqueous gel of a cellulose ether into a borehole penetrating a formation to be acidized. The slugs of gel serve as spacer slugs to divert the acid slugs into the portions of the formation or zones of a multi-zone formation it is desired to acidize. Alternatively, the gel slug can be injected first and the sequential injection of the acid and gel slugs can be repeated as desired.

In accordance with one specific embodiment of the invention, there is provided a method of matrix acidizing an underground formation comprising introducing into a borehole a slug of acid, then introducing a slug of a gelled cellulose ether aqueous solution to divert subsequent slugs of acid, and then introducing another slug of acid, etc. The gelled cellulose ether solution can also contain a finely divided solid such a diatomaceous earth to increase the strength of the gel.

Acids useful in the invention include any acid which is effective in increasing the flow of hydrocarbons through the formation and into the production well. Examples of acids which can be used include inorganic acids, such a hydrochloric acid, hydrofluoric acid, nitric acid, phosphoric acid, and sulfuric acid; organic acids, such as acetic acid, formic acid, tartaric acid, oxalic acid, and sulfamic acid; and combinations of inorganic and organic acids. The concentrations or strength of the acid can vary depending upon the type of acid, the type of formation being treated, and the results desired in the particular treating operation. For example, when hydrochloric acid solution is being used in a predominantly limestone formation, the concentration can vary from about 5 to about 38 weight percent HCl, with concentrations in the range of 10 to 30 weight percent usually preferred. Organic acids are usually used at lower concentrations, e.g., about 10 weight percent. One preferred mixture of inorganic acids and organic acids comprises mixtures of hydrochloric acid and acetic acid, for example, 15 percent hydrochloric acid solution containing sufficient acetic acid to bring the total acidity from about 20 to about 22 percent, based on equivalent HCl.

The acids used in the practice of the invention can contain any of the known corrosion inhibitors, demulsifying agents, sequestering agents, surfactants, friction reducers, etc., known in the art. The amount of acid used in any particular instance will depend upon a number of factors including the extent of the formation to be treated, the type of formation being treated, the type of acid, concentration of acid, and the formation temperature. Thus, the invention is not limited to using any particular amount of acid in the acidizing treatment of the invention. Any suitable amount of acid, depending upon the nature of the formation being treated, can be employed.

Generally, from about one to about 500 gallons of the acid per vertical foot of the oil-bearing formation gives improved results with this invention. More or larger amounts of the acid are also used, although such an amount will depend upon the desired economics and the conditions of the reservoir to obtain the most feasible dollar return for the money invested. Where large deposits of carbonate scale, iron sulfide scale, etc., are present, large amounts of acid are preferred. Amounts within the range of from about five to about 250 gallons per vertical foot of oil-bearing sand give satisfactory results and more preferably from about 25 to 200 gallons per vertical foot of formation.

Depending upon the requirements of the specific formation being treated, the size of the gel slugs can be from about 0.5 to about 20 volumes of aqueous gel per volume of acid. After each gel slug is injected, at a pressure below the fracturing pressure, a slug of acid can be similarly injected with little or no delay between slugs. The gel slugs will rapidly thicken as they encounter the higher formation temperatures and will form the temporary diversions.

After the last acid slug has been injected, the well is shut down for a period of time, say, twelve hours, to allow the acid to react. After about 24 hours, the gel slugs will have broken down sufficiently to permit well cleanup, testing, and resumption of operations.

In general, any of the water-soluble cellulose ethers can be used in preparing the aqueous gels used in the practice of the invention. The cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkylcarboxyalkyl celluloses such as ethylcarboxymethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC for carboxymethyl hydroxyethyl cellulose, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable. CMC having a degree of substitution greater than the above-preferred ranges usually has a lower viscosity and more is required in preparing suitable gels. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the gels used in the practice of the invention can vary widely depending upon the viscosity grade and purity of the ether, and properties desired in the aqueous gels of the invention. In general, the amount of cellulose ether used will be at least a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from 0.2 to 1.5, preferably from 0.3 to 1.0, weight percent, based on the weight of water, can be used as thickening amounts. Amounts within said ranges provide gels which are better suited for the plugging operations described herein than are the more dilute or more concentrated gels which can be prepared. Amounts of cellulose ether within the above ranges provide gels which develop good gel strength when allowed to come to rest in a fracture. The gels will also have sufficient early viscosity to obtain good displacement of water or other fluid from the fracture during placement of the gel, but will not be so viscous as to cause undue difficulties in the pumping thereof. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. If desired, stiff gels can be "thinned" by dilution to any desired concentration of cellulose ether. This can be done by mechanical means, e.g., stirring, pumping, or by means of a suitable turbulence inducing device to cause shearing, such as a jet nozzle. Thus, there is really no fixed upper limit on the amount of cellulose ether which can be used. However, when a liquid mobile gel is desired, e.g., for placement in a fracture, it is desirable to dilute the more concentrated gels before they become rigid.

Metal compounds which can be used in preparing the aqueous gels used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example, +6 chromium, which can lead to excessive amounts of +3 chromium when there is sufficient reducing agent present to reduce the excess of +6 chromium, can adversely affect the stability of the gels produced. As a general guide, the amount of the starting polyvalent metalcontaining compound used in preparing aqueous gels in accordance with the invention will be in the range of from 0.05 to 60, preferably 0.5 to 30, weight percent of the amount of the cellulose ether used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, we have discovered that when brines, such as are commonly available in producing oil fields, are used as the water in preparing gels in accordance with the invention, less of the starting polyvalent metal-containing compound is required than when distilled water is used. Stable gels have been prepared using brines having a wide range of dissolved solids content, e.g., from 850, 1,200, 6,000, and 90,000 ppm dissolved solids. Gelation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled as described herein.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, hydrogen sulfide, sodium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., requiring heating to about 125°–130° F. The presently most preferred reducing agents are sodium hydrosulfite, potassium hydrosulfite, sodium thiosulfate, and potassium thiosulfate. Said thiosulfates are particularly useful in preparing aqueous gels having a retarded gelling rate. For example, it has been found that in comparable solutions of CMC-9 and using comparable amounts of $Na_2Cr_2O_7 \cdot 2H_2O$, the addition of sodium hydrosulfite will initiate gelation within about 60 seconds; whereas the addition of sodium thiosulfate does no initiate gelation for about six minutes at essentially the same temperature conditions, 130° F.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent, valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution of the cellulose ether in water or other aqueous medium, or said metal-containing compound and said reducing agent can be added simultaneously to the solution or aqueous medium containing the cellulose ether. Generally speaking, where convenient, the preferred method is to first disperse the cellulose ether in the water or other aqueous medium. The metal-containing compound is then added to the solution or aqueous medium containing the cellulose ether, with stirring. The reducing agent is then added to the dispersion of cellulose ether, with stirring. Gelation starts as soon as reduction of some of the higher valence metal in the starting polyvalent metal-containing compound to a lower valence state occurs. The newly formed lower valence metal ions, for example, +3 chromium obtained from +6 chromium, effect rapid crosslinking of the cellulose ethers and gelation of the solution or aqueous medium containing same.

One presently preferred method of preparing said aqueous gels is to prepare the gel while the components thereof are being pumped into the well. Said method comprises preparing a base solution of the cellulose ether, adding to this base solution (a) a polyvalent metal compound such as sodium dichromate or (b) a reducing agent such as sodium thiosulfate or sodium hydrosulfite, pumping said base solution down the well and into the fracture, and during said pumping adding to said base solution the other of said reagents (a) and (b) which was not previously added thereto. It is also within the scope of the invention to incorporate all the components of the aqueous gel into a stream of water while it is being pumped, e.g., into a well. For example, CMC could be added first to the flowing stream of water and the other components added subsequently in any suitable order. Turbulent flow conditions in the pipe will provide proper mixing.

It is also within the scope of the invention to prepare a dry mixture of the cellulose ether, the metal-containing compound and the reducing agent, in proper proportions, and then add this dry mixture to the proper amount of water.

An advantage of the invention is that ordinary ambient temperatures and other conditions can be used in practically all instances in preparing the aqueous gels or aqueous mediums containing same. However, in some instances, a small amount of heat may be desirable to aid in the formation of the gel, e.g., heating to a temperature of about 125°–130° F. Aqueous gels can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of the cellulose ether, the type and amount of starting polyvalent metal compound used, and the type and amount of reducing agent used.

One procedure which can be employed to prepare said gels is to prepare a relatively concentrated or high viscosity gel and dilute same to a viscosity or concentration suited for the actual use of the gel. In many instances, this procedure results in a more stable gel.

When employing said dilution technique, a starting solution of cellulose ether containing, for example, 10,000 ppm (one weight percent) of cellulose ether can be used. This solution is then gelled by the addition of suitable amounts of polyvalent metal compound and reducing agent. After gelation has proceeded to the desired extent, the resulting gel can be diluted to the concentration or viscosity most suited for its intended use. The more concentrated cellulose ether solutions usually have a faster rate of gelation. Thus, in most instances, it will be preferred to carry out the dilution soon after the components of the gel have been added to the water or other aqueous medium, e.g., within about five to 30 minutes. Preferably, the concentration of the cellulose ether in the "concentrated gel" will be at least twice that in the final gel. Dilution of the gel retards the rate of gelation. Thus, this dilution technique can be employed to control the gelation rate, if desired. In many instances, gels prepared by employing said dilution technique are more stable. Another advantage of said dilution technique is that it is usually more convenient to weigh out and handle the larger quantities of reagents.

If desired, filler materials such as silica flour, diatomaceous earth, ground nutshells, finely divided natural sands, clay or clay-like materials such as Illite clay and kaolin, and finely divided plastic particles such as Microethene, etc., can be incorporated in the aqueous gels used in the practice of the invention.

The amount of said finely divided solids materials used in the practice of the invention will depend upon the material used, and the properties of the gel per se wherein said solids are used, and can be any suitable amount which is sufficient to cause said increase in gel strength. However, for economic reasons, it will seldom be desirable to use more than up to about two pounds of finely divided solids per gallon of finished gel because the incremental benefits obtained when using more than about one to 1.5 pounds per gallon of gel are usually small. When said filler agents are used, it will usually be desirable to use at least about 0.05, preferably at least about 0.1, more preferably at least about 0.3, pound of finely divided solids per gallon of gel. Thus, generally speaking, and as a guide to those skilled in the art, amounts of finely divided solids in the range of from 0.05 to 2, preferably about 0.1 to about 1.5, more preferably from about 0.3 to about 1, pounds per gallon of gel will usually be used in the practice of the invention. It is usually convenient to base said amounts on the volume of water used in preparing the gel.

Aqueous gels used in the practice of the invention and having finely divided solids incorporated therein can be prepared in any suitable manner. For example, the above-described methods for preparing gels which do not have finely divided solids incorporated therein can be used. When it is desired to prepare the gel, e.g., on the surface, and then pump same into place into a subterranean formation, it is preferred to disperse the finely divided solid material into the polymer solution prior to the addition of the reducing agent and oxidizing agent thereto. When the gel is being prepared in a conduit while the components thereof are being pumped into a well for introduction into a subterranean formation, the finely divided solid material can be added, either as an aqueous slurry or in the dry state by means of a mixing hopper, as the base solution containing the cellulose ether and other components are being pumped through said conduit. It will usually be preferred to add the finely divided solid material last.

It is indicated hereinbefore that the invention is applicable to the matrix acidizing of subterranean formations by introducing alternate slugs of gel and acid into a borehole penetrating the formation to be acidized. Preferably, the acid and gel are injected into the borehole at a pressure below the formation fracture pressure.

In the stimulation of an oil and/or gas formation with acids or acid mixtures in either injection wells or production wells, it is important to direct the acid into a zone of relatively low permeability but rich in oil and/or gas. Usually this is difficult to accomplish because most subterranean formations have a number of oil and/or gas-bearing zones with markedly different permeability. A number of such zones of relatively high permeability sometimes function as "thief zones" which permit the drive fluid to channel directly from injecton to production wells. For example, one such zone or streak could contain only about five percent of the residual oil but yet exhibit a permeability ten times that of the remaining zones containing 95 percent of the residual oil. In such formations, some method of acid diversion is necessary in order to successfully acidize all of the oil-bearing zones during a matrix acidizing treatment. The acid diversion process of the present invention, providing a more nearly uniform distribution of the acid, results in maximum stimulation benefits, i.e., increased permeability of the oilbearing zones permitting more efficient oil recovery. The following calculated example is illustrative of the inventive process.

CALCULATED EXAMPLE I

In a gas condensate producer well in West Texas, it is desired to matrix acidize a productive interval at a depth of 14,000 to 15,000 feet to improve the overall oil recovery efficiency, i.e., reduce the water/oil ratio at the production well. The productive interval in a carbonate region has a midpoint temperature of about 260° F. The open hole completion is from 14,000 to 15,000 feet and the hole size is 8¾ inches. In the vertical productive interval there are three zones of 25-foot thickness which exhibit permeabilities from five to over 50 times the average permeability of the entire 1,000-foot productive interval. Formation permeabilities range from 0.05 md in the tighter zones to 30 md in the very permeable zones. Well productivity prior to treatment is 5 M²CF/day with 50 barrels of condensate by natural flow.

The matrix acidizing treatment is preceded by the injection of 15,000 gallons of a two weight percent potassium chloride (70° F) brine at a non-pressure parting rate as a preflush to cool the wellbore and establish a desirable injection rate. This preflush is followed by the injection of 2,000 gallons of 15 weight percent aqueous hydrochloric acid at a nonfracturing rate. The injected acid preferentially passes into the higher permeability zones, namely, the three 25-foot thick zones noted above. The acid slug is followed by the injection of 10,000 gallons of a carboxymethyl cellulose (CMC) solution prepared on-the-fly by mixing into fresh water 78 pounds of CMC per 1,000 gallons of water followed by the addition of 12 pounds sodium dichromate, 78 pounds of sodium thiosulfate, and 300 pounds of diatomaceous earth (Diacel D) per 1,000 gallons of water. One or more conventional oilfield blenders are used in adding the above ingredients on-the-fly. A pressure increase is observed as the gel sets up in the higher permeability zones and restricts fluid flow into these zones. The gelling solution thus tends to enter the same higher permeability zones which take most of the acid slug. The CMC solution gels on entering zones at 120° to 130° F and the gel remains stable for two hours or more at temperatures in the range of 250° F.

The matrix acidizing process is continued by the injection of 5,000 gallons of 15 weight percent aqueous hydrochloric acid at a nonfracturing rate. This acid slug tends to pass into the more permeable regions remaining after the initial acid-gel sequence described above. Another 10,000-gallon CMC slug is injected followed by another 5,000-gallon slug of 15 percent hydrochloric acid. The well is then shut in for 12 hours to permit all the acid to react and allow sufficient time for the gels to break (approximately 24 hours) so that it can be produced back. The well is placed back into a flowing status and swabbed. The well productivity is tested and found to be significantly improved.

It is also contemplated that the inventive process could as well be initiated by the injection of the CMC solution followed by the acid solution. In either case, the inventive process assures the more nearly uniform acidization of the formation.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. An acid stimulation treatment process for improving hydrocarbon production from a producing well in fluid communication with a hydrocarbon-bearing subterranean formation by the introduction of alternate slugs of acid and an aqueous gel component which comprises the steps of:
   a. injecting a slug of an acid into a wellbore penetrating a subterranean formation at sufficient pressure to force at least a portion thereof into the formation into contact with the exposed faces of the formation to effectuate a controlled attack by the acid on the calcareous formation,
   b. injecting into said borehole a slug of a fluid comprising an aqueous gel, said gel comprising water to which there has been added a water-thickening amount of a water-soluble cellulose ether, a sensible amount of a water-soluble compound of a polyvalent metal wherein the metal present is capable of being reduced to a lower polyvalent valence state and which is sufficient to gel said water when the valence of at least a portion of said metal is reduced to said lower valence state, and an amount of a water-soluble reducing agent which is effective to reduce at least a portion of said metal to said lower valence state, and maintaining said gel in said borehole for a period of time sufficient for said gel to enter said formation and develop sufficient gel strength to remain in place in said formation and form a gel in that portion of the formation into which the acid of step (a) flowed,
   c. repeating steps (a) and (b) until the desired levels or zones of the formation have been acidized, and
   d. recovering hydrocarbon fluids from the subterranean formation.

2. A method according to claim 1 wherein the acid is selected from hydrochloric, hydrofluoric, sulfuric, nitric, phosphoric, acetic, tartaric, oxalic, sulfamic, and mixtures thereof.

3. A method according to claim 1 wherein said gel comprises water to which there has been added:
   from 0.2 to 1.5 weight percent of said cellulose ether, based upon the weight of said water;
   from 0.05 to 60 weight percent of said polyvalent metal compound, based upon the weight of said cellulose ether; and
   from 0.1 to at least about 200 percent of the stoichiometric amount of said reducing agent required to reduce said polyvalent metal to said lower polyvalent valence state.

4. A method according to claim 3 wherein said cellulose ether is a carboxymethyl cellulose ether.

5. A method according to claim 1 wherein the amount of each slug of acid injected into the formation ranges from about one to about 500 gallons of acid per vertical foot of oil-bearing formation and the amount of each slug of gel injected ranges from about 0.5 to about 20 volumes of aqueous gel per volume of acid.

6. A method according to claim 1 wherein each slug of aqueous gel is injected into the borehole at a pressure below the fracturing pressure.

7. A method according to claim 1 wherein after the last slug of acid has been injected the well is shut down for a period of time sufficient to allow the acid to react and after the acid has been allowed to react and the gel slugs have broken down sufficiently to permit well cleanup testing the oil-producing operations are resumed.

* * * * *